(12) United States Patent
Horn et al.

(10) Patent No.: US 11,176,133 B2
(45) Date of Patent: Nov. 16, 2021

(54) FILTER EVALUATION FOR TABLE FRAGMENTS

(71) Applicant: SAP SE, Walldorf (DE)

(72) Inventors: Oliver Horn, Nussloch (DE); Lars Fricke, Karlsruhe (DE)

(73) Assignee: SAP SE, Walldorf (DE)

( * ) Notice: Subject to any disclaimer, the term of this patent is extended or adjusted under 35 U.S.C. 154(b) by 215 days.

(21) Appl. No.: 16/375,246

(22) Filed: Apr. 4, 2019

(65) Prior Publication Data

US 2020/0320074 A1   Oct. 8, 2020

(51) Int. Cl.
*G06F 17/00* (2019.01)
*G06F 16/2453* (2019.01)

(52) U.S. Cl.
CPC .. *G06F 16/24542* (2019.01); *G06F 16/24537* (2019.01)

(58) Field of Classification Search
None
See application file for complete search history.

(56) References Cited

U.S. PATENT DOCUMENTS

| | | | |
|---|---|---|---|
| 2009/0259644 A1* | 10/2009 | Scheuermann | ... G06F 16/24542 |
| 2011/0083037 A1* | 4/2011 | Bocharov | ........... H04L 65/4069 |
| | | | 714/4.11 |
| 2013/0028174 A1* | 1/2013 | Cabos | .................. H04L 51/063 |
| | | | 370/316 |
| 2015/0277917 A1* | 10/2015 | Chavan | ............... H03M 7/6017 |
| | | | 712/7 |
| 2015/0286681 A1* | 10/2015 | Baer | ................. G06F 16/24554 |
| | | | 707/754 |
| 2015/0363167 A1* | 12/2015 | Kaushik | .................... G06F 7/24 |
| | | | 707/753 |
| 2016/0306995 A1* | 10/2016 | Arasu | ................. G06F 21/6218 |
| 2017/0109377 A1* | 4/2017 | Baer | ..................... G06F 16/335 |
| 2017/0109386 A1* | 4/2017 | Baer | ................. G06F 16/24554 |
| 2017/0109389 A1* | 4/2017 | Bardoliwalla | .... G06F 16/24539 |
| 2017/0116335 A1* | 4/2017 | Baby | .................... H04L 67/2814 |

* cited by examiner

*Primary Examiner* — Hasanul Mobin
(74) *Attorney, Agent, or Firm* — Mintz Levin Cohn Ferris Glovsky and Popeo, P.C.

(57) ABSTRACT

A method, a system, and a computer program product for analysis of query filtering mechanisms for table fragments. A query plan for execution of a query is generated. The query requires access to at least one table stored in a database system. The query includes one or more filter predicates. The table is partitioned into a plurality of fragments. A determination whether a fragment in the table is compressed and whether the fragment is associated with an index is made. A filter predicate is selected for processing the fragment. For the selected filter predicate, a filter evaluation of the selected filter predicate for the fragment is determined. The filter evaluation of the selected predicate is executed for the fragment.

14 Claims, 8 Drawing Sheets

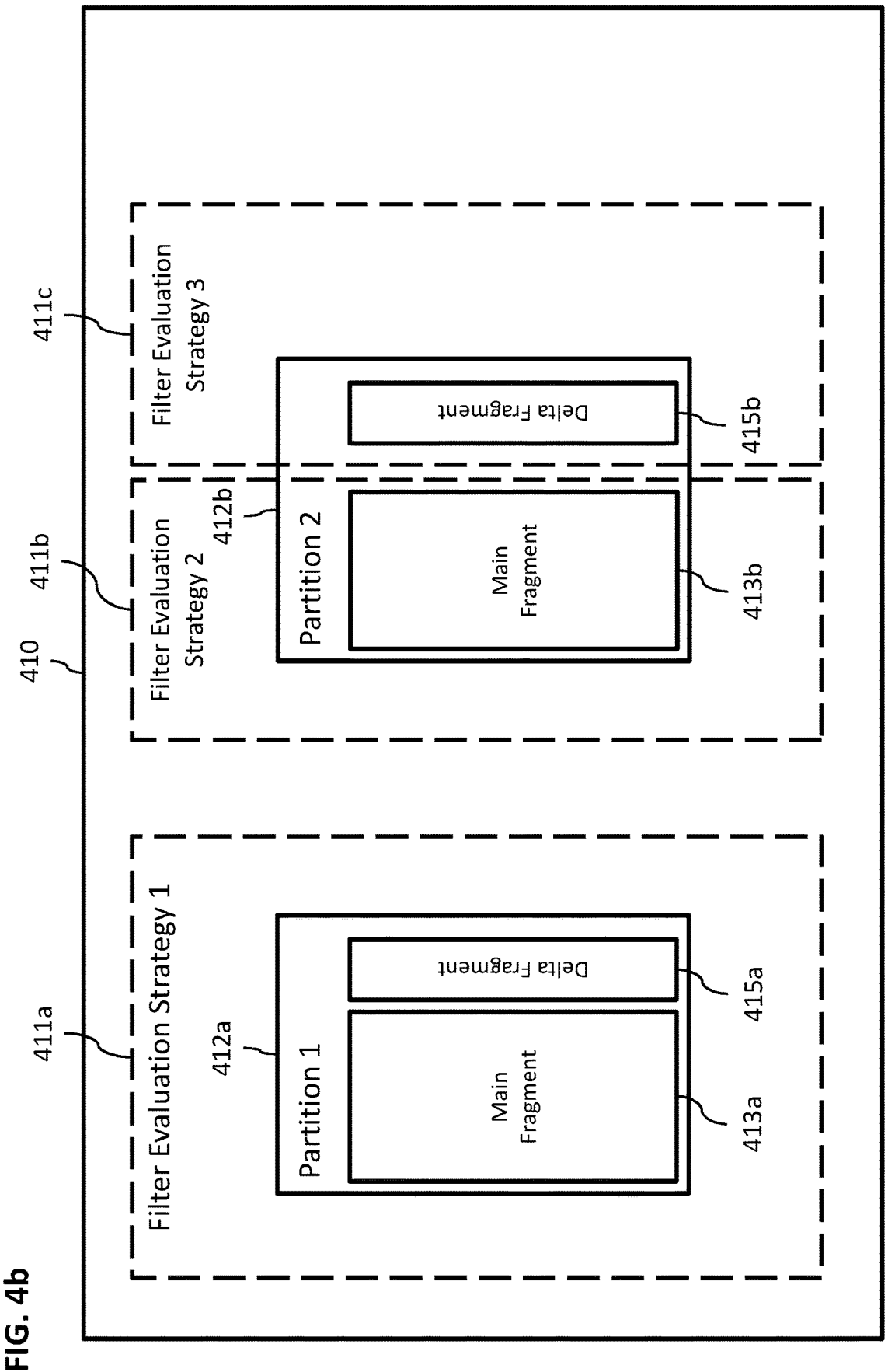

FILTER EVALUATION FOR TABLE FRAGMENTS

TECHNICAL FIELD

This disclosure relates generally to data processing and, in particular, to query execution, as well as analysis of query filtering mechanisms for table fragments.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance, including addressing responses to queries implementing analysis of query filters for table fragments.

SUMMARY

In some implementations, the current subject matter relates to a computer implemented for performing analysis of query filtering mechanisms for table fragments. The method may include generating a query plan for execution of a query, the query may require access to at least one table stored in a database system and may include one or more filter predicates, where the table may be partitioned into a plurality of fragments. The method may further include determining whether a fragment in the plurality of fragments is compressed and whether the fragment is associated with an index, selecting a filter predicate for processing the fragment, determining, for the selected filter predicate, a filter evaluation of the selected filter predicate for the fragment, and executing the filter evaluation of the selected predicate for the fragment.

In some implementations, the current subject matter can include one or more of the following optional features. The plurality of fragments may include at least one of the following: a main fragment associated with a column of the table and a delta fragment associated with the column of the table. The delta fragment may include one or more modification of a data included in the column.

In some implementations, the index may include at least one of the following: a full index and a block index. Further, upon determination that the fragment is not compressed, at least one index lookup operator may be used during execution of the filter evaluation of the selected predicate for the fragment. Upon determination that the fragment is compressed, at least one data vector scan operator may be used during execution of the filter evaluation of the selected predicate for the fragment.

In some implementations, filter evaluation strategies may include at least one of the following combinations: a dictionary scan and a data vector scan, a dictionary scan and a data vector lookup, a dictionary scan and an index lookup, and a data vector lookup and a dictionary lookup.

In some implementations, the query may be executed by a database execution engine and the query may be received from an application separate from the database execution engine. The query may be executed in accordance with the query plan optimized by the database execution engine.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4*b* illustrates an exemplary table that includes various partitions;

DETAILED DESCRIPTION

Figure 1:
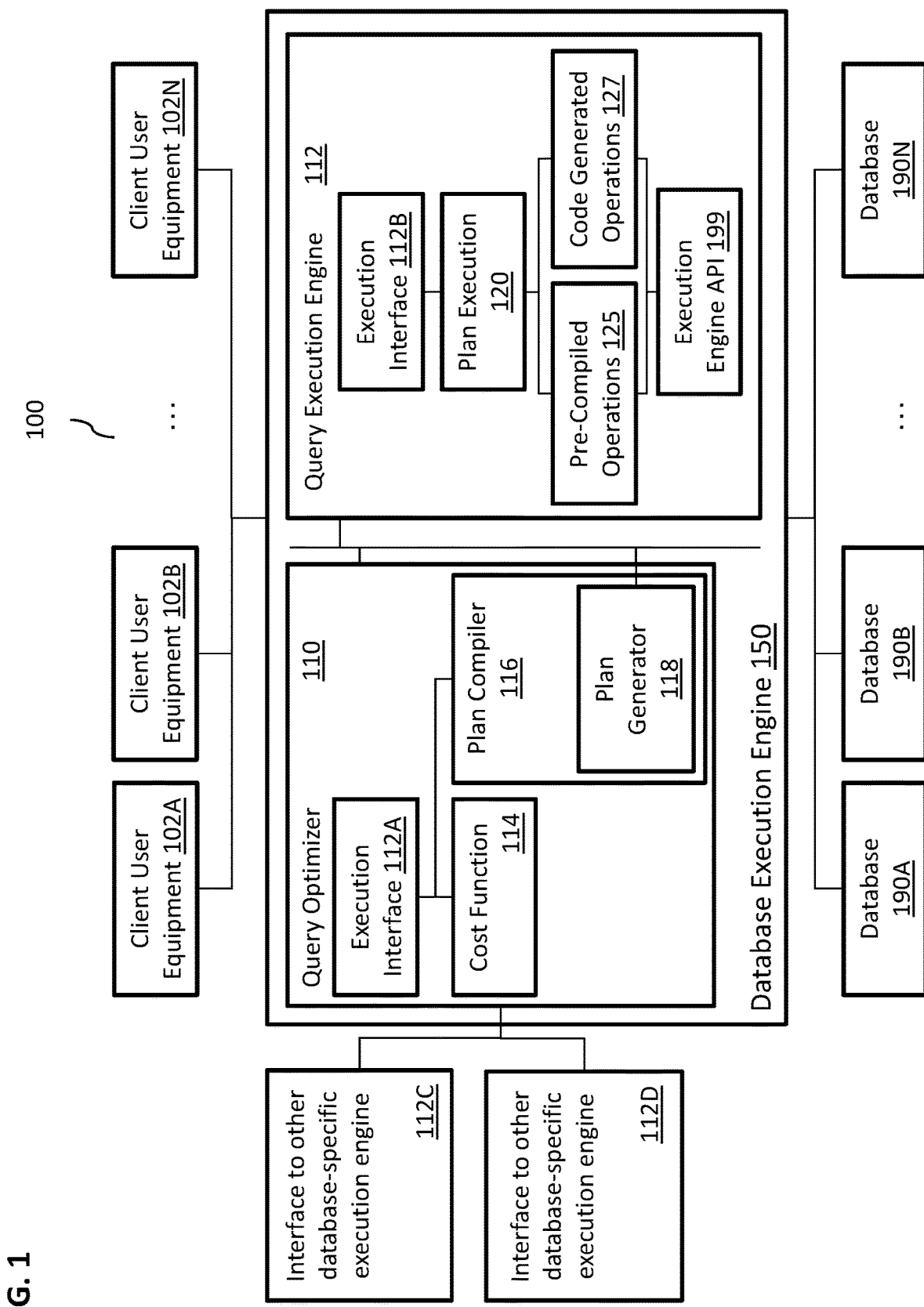
FIG. 1 illustrates an exemplary block diagram for a system, according to some implementations of the current subject matter.

To address these and potentially other deficiencies of currently available solutions, one or more implementations of the current subject matter relate to methods, systems, articles of manufacture, and the like that can, among other possible advantages, provide an ability to perform query execution planning, including determination of associated cost heuristics for evaluation of query filters for table fragments.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 illustrates an exemplary system 100, in accordance with some example implementations. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a column "X" for the value ID of "1" and an indexvector scan (or data vector scan, which are used interchangeably herein) with a valueid (or ValueID, or valueID, or Valueid, which are used interchangeably herein) obtained from the dictionary look up, which results in a document ID (or DocumentID, or documentid, or docid, which are used interchangeably herein) list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls Made On Database API |
| --- | --- |
| 1) TableScan (Filter X = 1) | dictionary lookup column "X" for the value of ID of "1" indexvector scan with a valueid from the lookup, which results in a document ID (docid) list that identifies one or more rows in table "1" |
| 2) Materialization (Columns A, B) | for each docid, lookup value IDs (valueids) for columns A + B for the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

Figure 2:
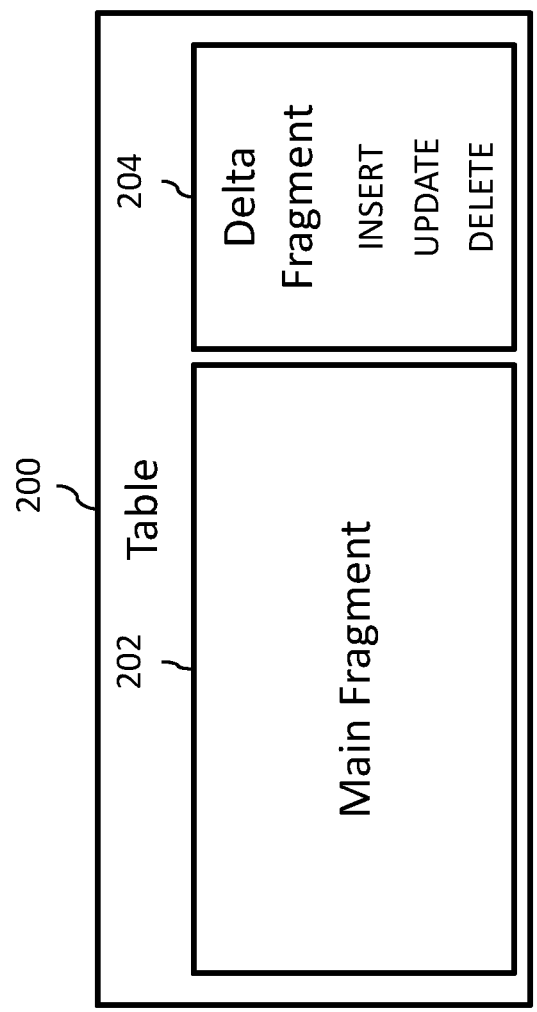
FIG. 2 illustrates an exemplary table in a column store.

As shown in FIG. 2, tables (e.g., table 200) in a column store database system may be separated into two separate containers or partitions—a main fragment/partition 202 and a delta fragment/partition 204. The terms fragment and partition may be used interchangeably herein.

The main fragment 202 may include data that is not subject to change or data that has not been changed recently. This fragment may be optimized for read-access, e.g., using dictionary compression with sorted dictionaries. All updates to a table may be implemented as changes to the delta fragment 204. These may include INSERT, UPDATE, DELETE, etc. changes to the data. Dictionary compression may also be applicable to the delta fragment 204. The contents of the delta and main fragments 202, 204 may be combined using a merge operation. This operation may provide the only way to write to the main fragment 202. The merge operation may be performed (e.g., automatically, manually, etc. by the database system) to make sure that the delta fragment 204 does not contain more than a predetermined amount of table data (e.g., no more than 10%).

The table 200 may be split into even further partitions or fragments using one or more pre-defined partition criteria. In this case, multiple main fragments and multiple delta fragments may exist, where each column of the table may exist in each fragment. This may make table scans (TableScan) more complicated and burdensome on the system. A TableScan may involve searches (e.g., predicate evaluations) on one or multiple columns across one or multiple partitions. A TableScan may include one or multiple fragment scans (FragmentScans), where each FragmentScan may include of one or multiple column scans (ColumnScans). A ColumnScan may involve evaluation of a predicate on a column. For example, in the following query statement

SELECT*FROM T WHERE A>1 AND B<=2 OR C<>3

The system 100 (shown in FIG. 1) may have to evaluate predicates A>1 on column A, B<=2 on column B, and C<>3 on column C in all fragments/partitions of table T. As such, the system 100 may perform a TableScan that may include FragmentScans for each fragment and each FragmentScan may include a ColumnScan on A, a ColumnScan on B and a ColumnScan on C. As such, for the whole table search, the system 100 may have to scan each fragment to find all matching rows responsive to the above query statement.

As indicated above, queries use predicates to select and/or filter data in a table using various values that may be assigned to the predicates. A predicate may define a logical condition that may be applied to rows in a table. A predicate may be included in clauses, functions, and expressions in query statements (e.g., SQL queries). It returns true, false, or unknown. In some implementations, a predicate may be used in a search condition of a WHERE clause, a HAVING clause, a SELECT clause, a join condition of FROM clauses, and/or any other constructs where a Boolean value may be used.

Column store tables may also be compressed. Typically, a compression operation on such column store table may create a compression dictionary, assuming one does not exist, and it may compress rows of the table without moving them. During compression operation, the data may be sorted out and a ValueID may be mapped against each unique value in the column. The system may save this information in a dictionary, where actual entries may include only ValueID of the corresponding entry. Further, in each fragment of the table, the same column may have different compression and an index (which may be implicitly created) may exist on one fragment, but not on another fragment of the table. This means that the filter evaluation process may need to be different for each fragment.

In some implementations, the current subject matter system may be configured to perform analysis of filtering predicates in queries using one or more filter evaluation mechanisms. Selection of a particular evaluation strategy may have a significant impact on an amount of compute resources and time that may be required to perform analysis of a specific query filter.

In some implementations, the current subject matter may determine and select among the following evaluation strategies: a dictionary scan (DictionaryScan ("DS")) and a data vector scan (DataVectorScan ("DVS")), dictionary scan (DictionaryScan) and a data vector lookup (DataVectorLookup ("DVL")), dictionary scan (DictionaryScan) and index lookup (IndexLookup ("IL")), and data vector lookup (DataVectorLookup) and dictionary lookup (DictionaryLookup ("DL")).

In a dictionary scan, a dictionary may be used to find all ValueIDs that may match a particular query predicate (e.g., a column, an operator, and/or any other query parameter (e.g., A=1)). Using an index lookup (if an index exists), the database system may read the data in the index directly and when it finds the data in the index that is being sought, the system may use addresses of the records in the index in the table and read only what is required. Because an index is ordered, an index lookup may read less data and hence, involve less compute resources than the table scan, even though the actual data is still obtained from the table after completion of the search (assume other data, besides the index, is being sought).

Figure 3:
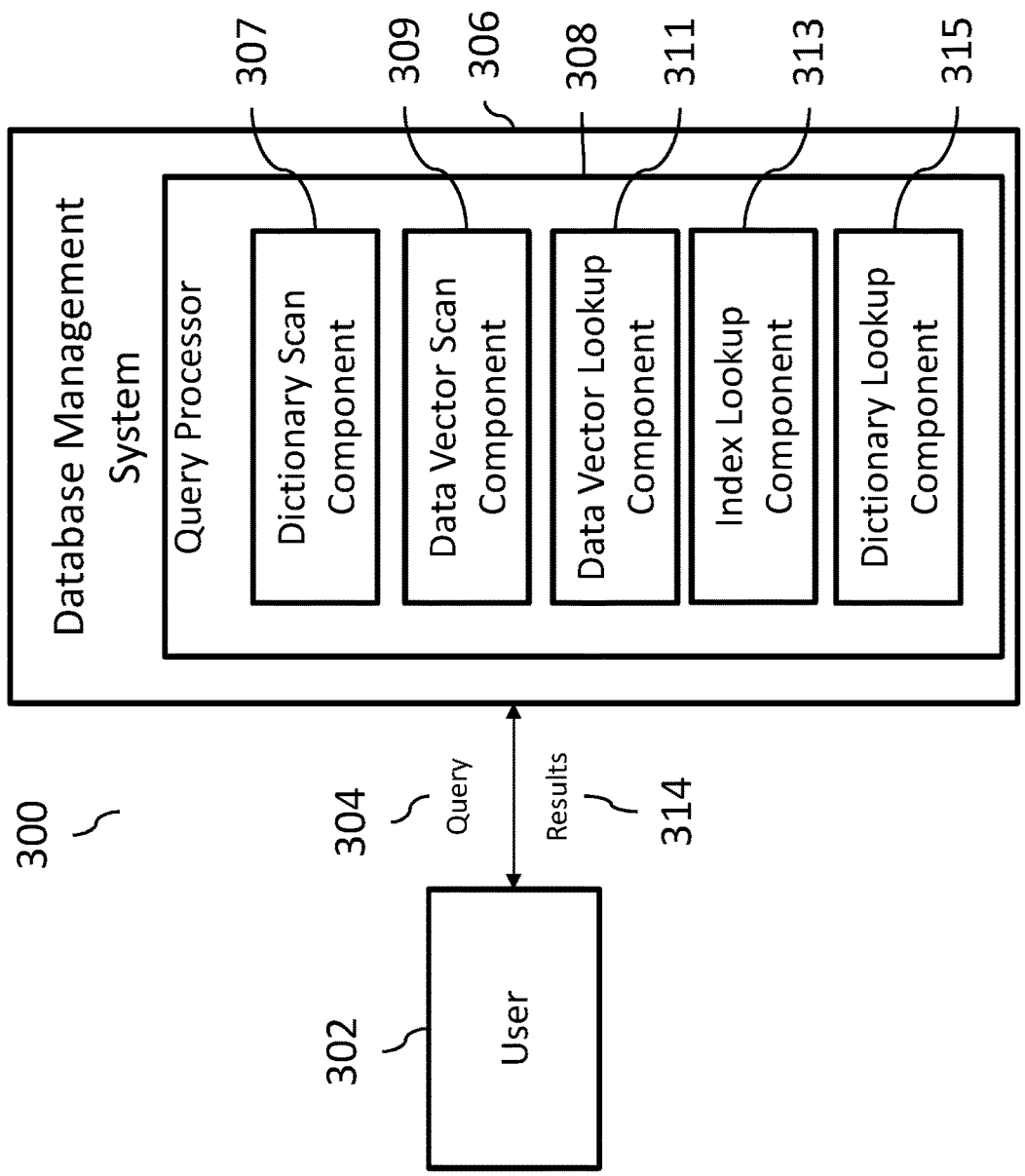
FIG. 3 illustrates an exemplary system for execution of a query, according to some implementations of the current subject matter.

FIG. 3 illustrates an exemplary system 300 for execution of a query, according to some implementations of the current subject matter. The system 300 may be incorporated into the system 100 shown in FIG. 1. The system 300 may include a database management system 306 that may include a query processor 308 that may perform execution of queries 304 submitted by a user 302. The query processor 308 may include a dictionary scan component 307, a data vector scan component 309, a data vector lookup component 311, an index lookup component 313, and a dictionary lookup component 315.

Components and/or users of the system 300 may be any type of hardware, software, and/or any combination of both. A component of the system 300 may further include entire computing systems that may have its own libraries, user interface elements, deployment parameters and/or systems, lifecycles, operation and support processes, etc. Each of the user 302, system 304, processor 308, etc. databases may be any type of computing systems, computing components, software, hardware, cloud computing systems, etc., and/or any combination thereof. For example, the system 300 may be implemented in various in-memory database systems, such as a High Performance Analytic Appliance ("HANA") system as developed by SAP SE, Walldorf, Germany.

In some implementations, the components of the system 300 may be communicatively coupled using any type of communication connection, which may include, but is not limited to, wired, wireless, and/or a combination of both network(s). The networks may include various local area networks (LAN), wide area networks (WAN), metropolitan area networks (MAN), virtual private networks (VPN), virtual local area networks (VLAN), and/or any combination thereof.

In some implementations, the system 300 may be configured to analyze a query plan and, in particular, evaluate filter predicates contained in the query for data searching purposes using one or more or any predetermined combination (as discussed herein) of the components 307-315. Based on the evaluation of the filtering components, a cost function may be determined for each combination of the searching strategies that may be implemented using one or more (or any predetermined combination of) components 307-315. Using the results of the cost function, an appropriate data searching strategy may be selected in a most cost-effective manner (e.g., consuming fewer compute resources, requiring less time to generate results 314, etc.).

In some implementations, the system 300 may use DictionaryScan and DataVectorScan filter evaluation process to evaluate filter predicates. Using the dictionary scan component 307 (as shown in FIG. 3), the system 300 may scan a dictionary to find all ValueIDs that match a particular predicate (e.g., a column, a query operator, a particular query parameter (e.g., A=1), etc.). Then, the system 300 may use data vector scan component 309 to scan the data vector to find all rows that match those ValueIDs. Dictionary scans on fixed or variable size columns may be executed by the dictionary scan component 307.

In alternate implementations, DictionaryScan and DataVectorLookup filter evaluation of filter predicates may be executed by the system 300. Using this strategy, the system 300 may use one or more existing previous results of rows and perform DataVectorLookup analysis (which may be performed by the component 311). The system 300 may process filter WHERE A=1 AND B=2 and may evaluate A=1 using dictionary scan component 307 and data vector scan component 309, and may use the outcome of that as additional input for evaluation of B=2. Instead of scanning through all rows of a table on the data vector of column B, the system 300 may lookup the rows that matched A=1 and check if the ValueID on each row is in the set of ValueIDs determined by the dictionary scan on column B.

In another alternate implementations, the system 300 may execute DictionaryScan and IndexLookup filter evaluation to evaluate filter predicates. Here, the system 300 may use component 307 to perform the dictionary scan in accordance with the discussion above, and component 313 to perform an index lookup. The index (if one exists) may allow a determination, for each ValueID, the rows on which this ValueID appears. Hence, by executing index lookups, all matching rows for the found ValueIDs may be determined after performing the dictionary scan.

In yet another alternate implementations, DataVectorLookup and DictionaryLookup may be used to evaluate filter predicates by the system 300. In this case, a previous result of evaluation may be needed as a precondition. In the example WHERE A=1 AND B=2, filter condition B=2 may be evaluated without performing a dictionary scan. The system 300 may perform a lookup of each row from the previous result in the data vector to determine the ValueID, then perform a lookup of the dictionary using the determined ValueID and ascertain the value. Then, the system 300 may evaluate whether the ascertained value matches the predicate B=2 and if not, the row may be removed from the previous result.

In some implementations, the system 300 may be configured to execute different filter predicate evaluations for one or more table fragments and/or based on index availability, different compressions and/or any other factors. In that regard, different evaluation order of predicates and/or different tree structures for a filter tree (e.g., while the table filter is represented as a tree) may be used by the system 300.

The following example illustrates use of different filter evaluation mechanisms by the system 300. Assuming the following query:

SELECT*FROM T WHERE ITEM_KEY=1 AND MONTH=3 AND YEAR=2018

Figure 4A:
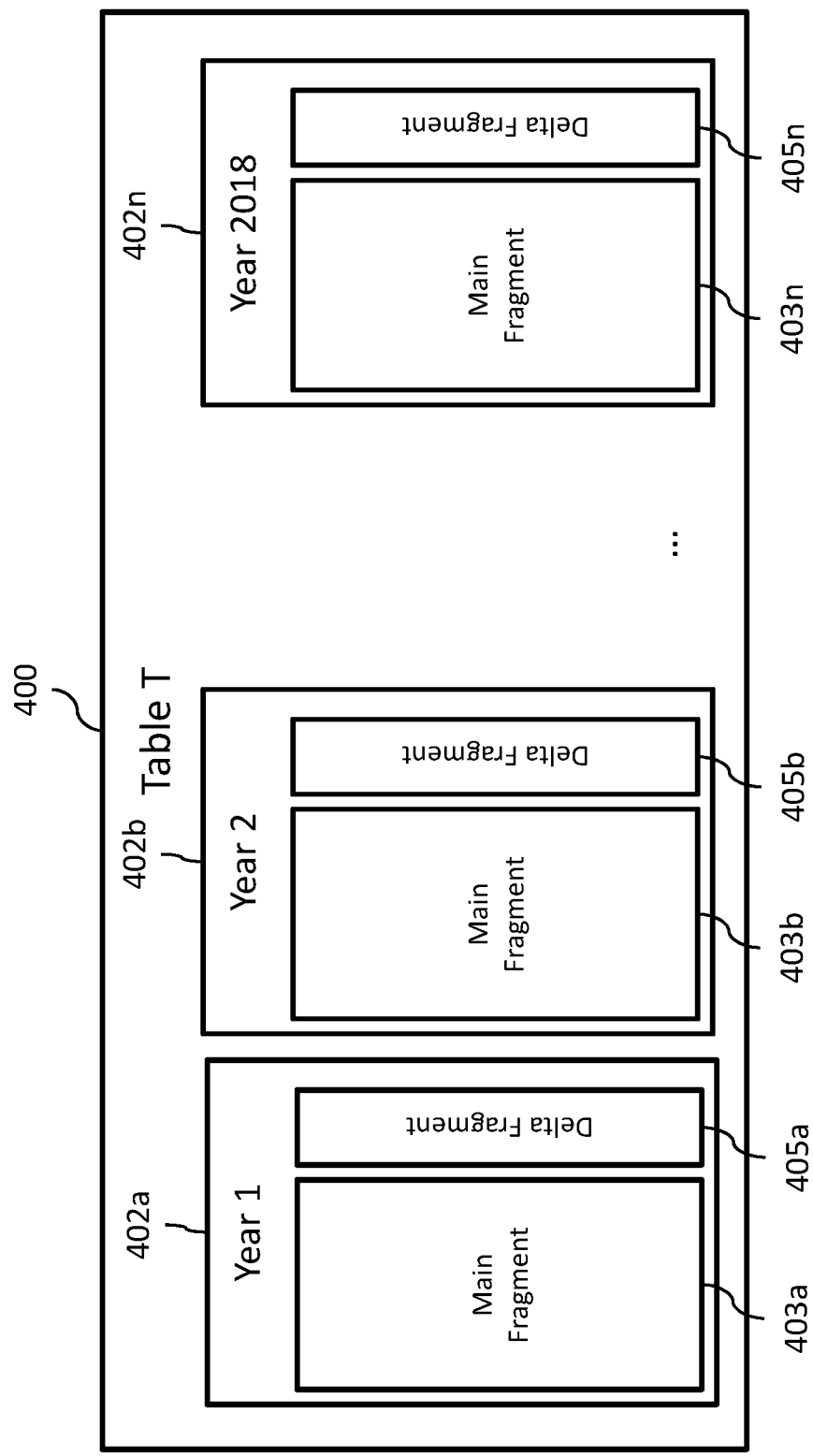
FIG. 4*a* illustrates an exemplary table having a plurality of partitions.

In the above query, T may be a column store table that is range-partitioned over YEAR and having an index on ITEM_KEY. As shown in FIG. 4a, table T 400 may include partitions 402 ($a, b, \ldots n$) for each year. Each partition 402 may include a main fragment 403 and at least one delta fragment 405 (FIG. 4a illustrates only one delta fragment, however, as can be understood, more than delta fragment may be presented in the each partition 402).

Depending on the data distribution and distinct values of a particular column (e.g., column A (not shown in FIG. 4a) in Table T) in the Table T 400, a column may or may not be compressed. Additionally, each fragment within the columns may or may not be compressed. It should be noted that different types of compression mechanisms exists for compression of main fragments, however, delta fragments are typically not compressed. If a fragment of column A is not compressed, then the system 300 (shown in FIG. 3) may be configured to generate a full index for that fragment. However, if a fragment is compressed, the system 300 may be configured to generate a block index (depending on the type of compression applied to the fragment). Alternatively, a full index for the compressed fragment may also be generated. A block index may summarize large blocks of data into a compact form. Such form may allow exclusion of such large blocks of data from a database query at an early stage, i.e., a large block of data may be excluded for each comparison. Use of the block index may substantially reduce an amount of data that may need to be examined on a row-by-row basis in order to respond to the query. A block index shows blocks of data that would not be relevant when responding to a query and hence do not need to be processed any further, which is different from a traditional index that locates regions in a table containing values of interest. Hence, the behavior of the block index and the full index are different. For example, the system 300 might not use a block index for a row lookup, where the full index may be used for that purpose.

Further, the block index may allow for a faster scan of table data as opposed to the full index. In particular, a full index may allow performance of index lookups. In a lookup, for a particular valueID all rows (or documentIDs) where that valueID appears may be retrieved. A valueID represents one distinct value in a dictionary. For example, if EQ predicate (e.g., A=1) is being evaluated during a query, then at most find one valueID that matches that predicate may be determined, thereby an index lookup may need to be performed afterwards. For other predicates (e.g., BETWEEN, LIKE, $>$, $>=$, $<=$, $<$, $<>$, etc.) more than one value in the dictionary may generate a match. Thus, any intermediate results of the evaluation may include multiple valueIDs (i.e., a valueIDSet).

To determine all rows that match a valueIDSet, multiple index lookups (one for each valueID in the valueIDSet) may need to be performed. The retrieved documentIDs may need to be merged together and, subsequently, sorted. This process may or may not be as efficient as scanning through a data vector (in an ordered manner) and determining whether the valueID corresponding to a row is in the intermediate valueIDSet or not. Thus, as stated above, a block index may be helpful in excluding "non-interesting" blocks (i.e., blocks that do not include matching data). As such, using a block index may be beneficial for BETWEEN, LIKE, $>$, etc. predicates, whereas a full index would not be. As such, the block index may allow for a faster scan of table data as opposed to the full index depending on the type of predicate ($=$, $>$, $>=$, $<=$, $<$, $<>$, BETWEEN, LIKE, . . . ).

Referring back to FIG. 4a, system 300 (shown in FIG. 3) may be configured to generate a query execution plan that may include operators for each fragment. Further, depending on an availability and type of an index (e.g., full vs. block), the system 300 may also include one or more index lookup operators and/or data vector scan operators (which use a block index, if available) for a particular fragment of the table. In particular, for ITEM_KEY=1 in the above query statement, use of filter evaluation strategies and any operators, for processing any main fragments of table T may depend on availability and type of index. However, the system 300 may be configured to use index lookup operators for any delta fragments for processing of ITEM_KEY=1. Further, use of any specific filter evaluation strategies (for example, use of scans vs. use of lookup methodologies discussed above) in query execution plans and/or sub-plans may be dependent on cost functions that may be associated with such strategies.

In some implementations, the system 300 may be configured to evaluate predicates in any order. The order of evaluation of predicates within one fragment may be independent of the fragment type, i.e., delta or main. In some implementations, predicates may be compared to each other and ordered by using their selectivity (e.g., best selectivity first (where a better selectivity has a value closer to 0.0 and worse selectivity has a value closer to 1.0)). For example, for one predicate of Table T 400, it may be beneficial to start evaluation by performing a lookup of any data that matches the ITEM_KEY=1 predicate and then continue with evaluation of the MONTH=3 predicate in the above query statement. However, for a different predicate, it may be more beneficial to use a different evaluation order, i.e., start with the evaluation with MONTH=3 predicate and then continue with ITEM_KEY=1 predicate evaluation. As can be understood, there may be various combinations of order of evaluation of predicates, especially, for queries that have a substantial number of predicates.

In some implementations, different filter evaluation strategies may be executed for different partitions within a table and/or different fragments within a partition. FIG. 4b illustrates an exemplary table 410 that includes partitions 412a and 412b. Partition 1 412a may include a main fragment 413a and a delta fragment 415a. Partition 2 412b may include a main fragment 413b and a delta fragment 415b. As shown in FIG. 4b, filter evaluation strategy 1 411a may be selected for the partition 1 412a. Filter evaluation strategy 2 411b may be selected for the main fragment 413b of the partition 2 412b, whereas filter evaluation strategy 3 411c may be selected for the delta fragment 413c of the partition 2 412b. These selections may be made based on a determination of availability and/or various cost functions associated with each available filter evaluation strategy (as discussed herein).

By way of another example, the following query may be executed on a table T range-partitioned into two partitions: partition 1 for YEAR=2019 and partition 2 for YEAR BETWEEN 2000 AND 2018
 SELECT*FROM T
 WHERE MONTH=3 AND YEAR>=2018
In some implementations, partition-criteria may be evaluated, samples min and max values as well as distinct values of the columns YEAR and MONTH may be determined. Additionally, by way of a non-limiting example, the current subject matter system may estimate that YEAR>=2018 has a selectivity of 0.1 (2 out of 20) and MONTH=3 has a selectivity of 0.08333 (1 out of 12) for the whole table T. Thus, the current subject matter system may determine that MONTH=3 may be evaluated first and YEAR>=2018 may be evaluated second as a strategy for all table fragments.

Using a fragment-wise approach, by way of a non-limiting example, the current subject matter system may estimate that YEAR>=2018 has a selectivity of 1.0 on partition 1 and 0.053 (1 out of 19) on partition 2. The selectivity of MONTH=3 may still be the same (i.e., 0.08333). In this case for partition 1, MONTH=3 may be evaluated first; however, for partition 2 YEAR>=2018 may be evaluated first.

In some implementations, the order in which fragments are scanned may be arbitrary. For example, to determine all matching rows, all fragments of a table may be scanned. However, in some exemplary implementations, where a limit may be involved, as for example in a query: SELECT*FROM T WHERE A=1 AND B=2 LIMIT 10, scanning may start with fragments that may have a higher probability of containing 10 rows that match the filter A=1 AND B=2.

In some implementations, a type of compression and/or availability/type of index may affect selection of a specific evaluation strategy (e.g., a scan vs. a lookup and/or both) and/or addition of particular scan/lookup operators. The following discussion illustrates how selection of strategies may be affected by the compression/index/etc. In some implementations, such selections may be based on estimations and/or predicted "costs" of filter strategies (as identified above) for the evaluation. At the outset, a determination may be made as to which filter strategies may be available for a particular predicate. The strategies may be selected from the following four filter evaluation mechanisms: DictionaryScan and DataVectorScan ("DS&DVS"), DictionaryScan and DataVectorLookup ("DS&DVL"), DictionaryScan and IndexLookup ("DS&IL"), and DataVectorLookup and DictionaryLookup ("DVL&DL"). However, some of these might not be available or possible. For example, if there is no full index, index lookups might not be possible. Further, if the predicate is a LIKE REGEX predicate, then dictionary scans might not be possible and DVL&DL filter evaluation strategy may need to be executed regardless of possible "costs". Moreover, if the predicate is a CONTAINS predicate, then the DVL&DL filter evaluation strategy might not be possible. As can be understood, the above are exemplary, non-limiting implementations of the current subject matter. Selection of a particular strategy may or may not be independent of costs associated with one or more strategies, and may or may not depend on availability/non-availability of one or more strategies, requirement to use a particular strategy, and/or any other factors.

Once the unavailable or unfeasible filter evaluation strategies are removed, a determination as to predicted "costs" for the remaining available filter evaluation strategies may be made. The "costs" may be determined without accounting for differences between fragments as well as using various aggregation. For example, assuming that 5% of the data is contained in delta fragments and 95% is in main fragments, different cost functions, which take an evaluation on the delta fragments into account, will have 5% influence into the whole cost function, while the cost function for main fragments may have 95% influence. Alternatively, if on all fragments a column has ANY index (either block or full), the index lookup may be selected as a valid strategy, and if in at least one fragment no index is available, then the DS&IL filter evaluation strategy may be rejected and no costs for it would be determined.

In some implementations, if the DS&IL filter evaluation strategy was selected, but the index types are different for each fragment, then an index lookup may be applied to those fragments that have a full index and a data vector scan with block index usage may be applied to those fragments that have some block index type.

In some implementations, each fragment may be specifically evaluated by determining what is its exact compression type or whether no compression occurs in this fragment, what is its index type, and/or whether the fragment is a delta fragment or a main fragment. Then, more precise cost functions for a valid each strategy may be determined, which is not based on aggregated information but instead based on the information about that specific fragment. Further, the cost functions for each strategy may be compared with each other, which may result in a different decision as to evaluation strategy for a particular predicate.

In some implementations, if aggregation of the main and delta fragments is broken, a cost function that assumes 100% of the data to be in delta fragments may be used for the delta fragments, and another function that assumes 100% of the data is in main fragments may be used for the main fragments. For example,

SELECT*FROM T
WHERE A>1

In some implementations, the cost functions for each filter evaluation strategy may be determined for A>1 as follows:
DS&DVS_Table: 0.05*DS&DVS_Delta+0.95*DS&DVS_Main=0.05*5000+0.95*3000=3100
DS&IL_Table: 0.05*DS&IL_Delta+0.95*DS&IL_Main=0.05*3200+0.95*3200=3200
DVL&DL: n/a In view of the above, DS&IL would be selected for both delta and main fragments.

Alternatively, using the fragment-wise decision, for delta fragments the following cost functions may be determined as follows:

Delta Fragments:
DS&DVS_Delta: 5000 (DVS on delta for range predicates like >, >=, <=, < and BETWEEN are typically more expensive than on main as data is not ordered or ordered differently than on main)
DS&IL_Delta: 3200
DVL&DL: n/a DS/IL strategy would be selected for evaluation of delta fragments.

Main Fragments:
DS&DVS_Main: 3000
DS&IL_Main: 3200
DVL&DL: n/a

Hence, DS/DVS would be selected for evaluation of main fragments.

The following example illustrates filter evaluation strategy selection in view of presence of compression/no compression. Assume there are two partitions 1 and 2, where partition 1 is compressed and partition 2 is not compressed. Further, assume the filter evaluation strategy for A>1 in the query below is already selected and a filter evaluation strategy for evaluation of predicate B<>2 needs to be made:

SELECT*FROM *T*
WHERE *A*>1 AND *B*<>2

Using Table-Wise Decision:
DS&DVS/DVL: 3500 (using some cost function that aggregates both types, compressed and non-compressed)
DS&IL: 52000
DVL&DL: 3000

Hence, DVL&DL filter evaluation strategy would be selected for both fragments.

Using Fragment-Wise Decision:
Fragment 1:
DS&DVS/DVL: 2800 (cheaper due to compression)
DS&IL: 70000
DVL&DL: 3000

Thus, DS&DVS/DVL filter evaluation strategy would be selected for fragment 1.

Fragment 2:
DS&DVS/DVL: 4000
DL&IL: 38000
DVL&DL: 3000

DVL&DL filter evaluation strategy would be selected for fragment 2.

The above examples illustrate that having separate filter strategies for each fragment may provide more optimization potential than having a single filter strategy that is applied to all fragments.

Figure 5:
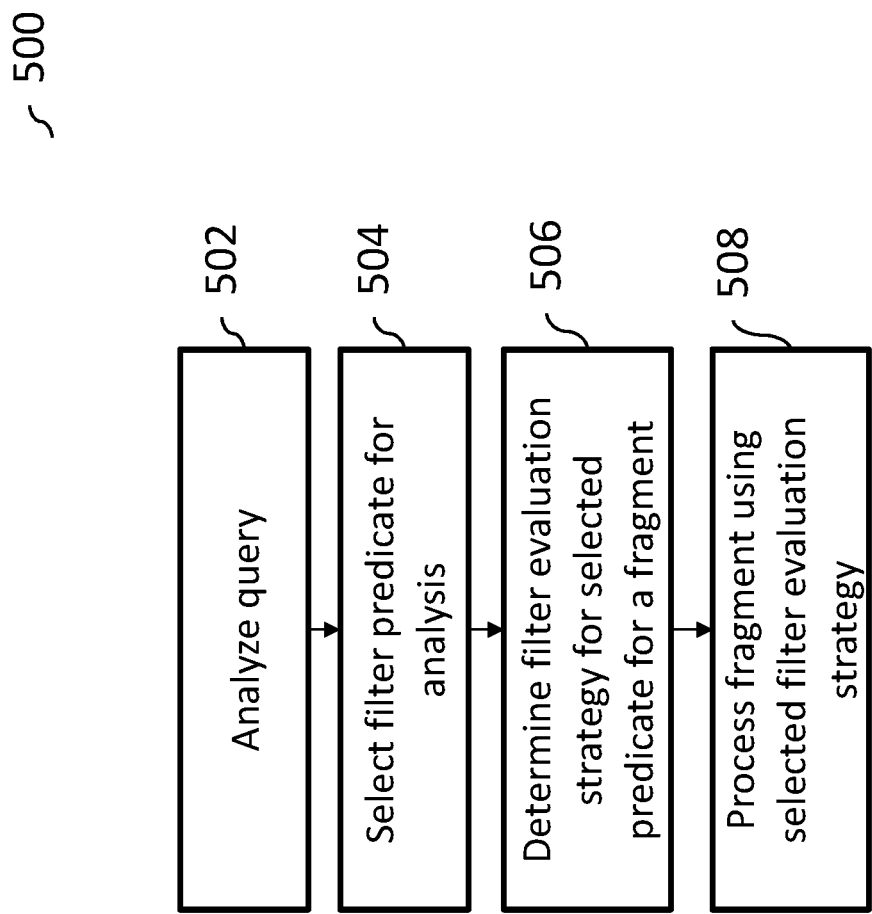
FIG. 5 illustrates an exemplary process for executing queries that may be performed by the system shown in FIG. 3, according to some implementations of the current subject matter.

FIG. 5 illustrates an exemplary process 500 for executing queries that may be performed by the system 300 shown in FIG. 3, according to some implementations of the current subject matter. At 502, a query and its predicates may be analyzed. At 504, a filter predicate or a query clause may be selected for the purposes of performing analysis of a particular filter for a particular fragment of a column in a table. At 506, a filter evaluation strategy for the selected predicate and the fragment may be determined (which may be executed by one or more of the components 307-315 shown in FIG. 3). In some implementations, cost functions of combinations of various filter evaluation strategies may be determined and compared. Based on the comparison of the strategies, the most effective (e.g., less compute-intensive, less time-consuming, etc.) strategy may be selected, and using that strategy, the particular fragment may be processed, at 508.

Figure 6:
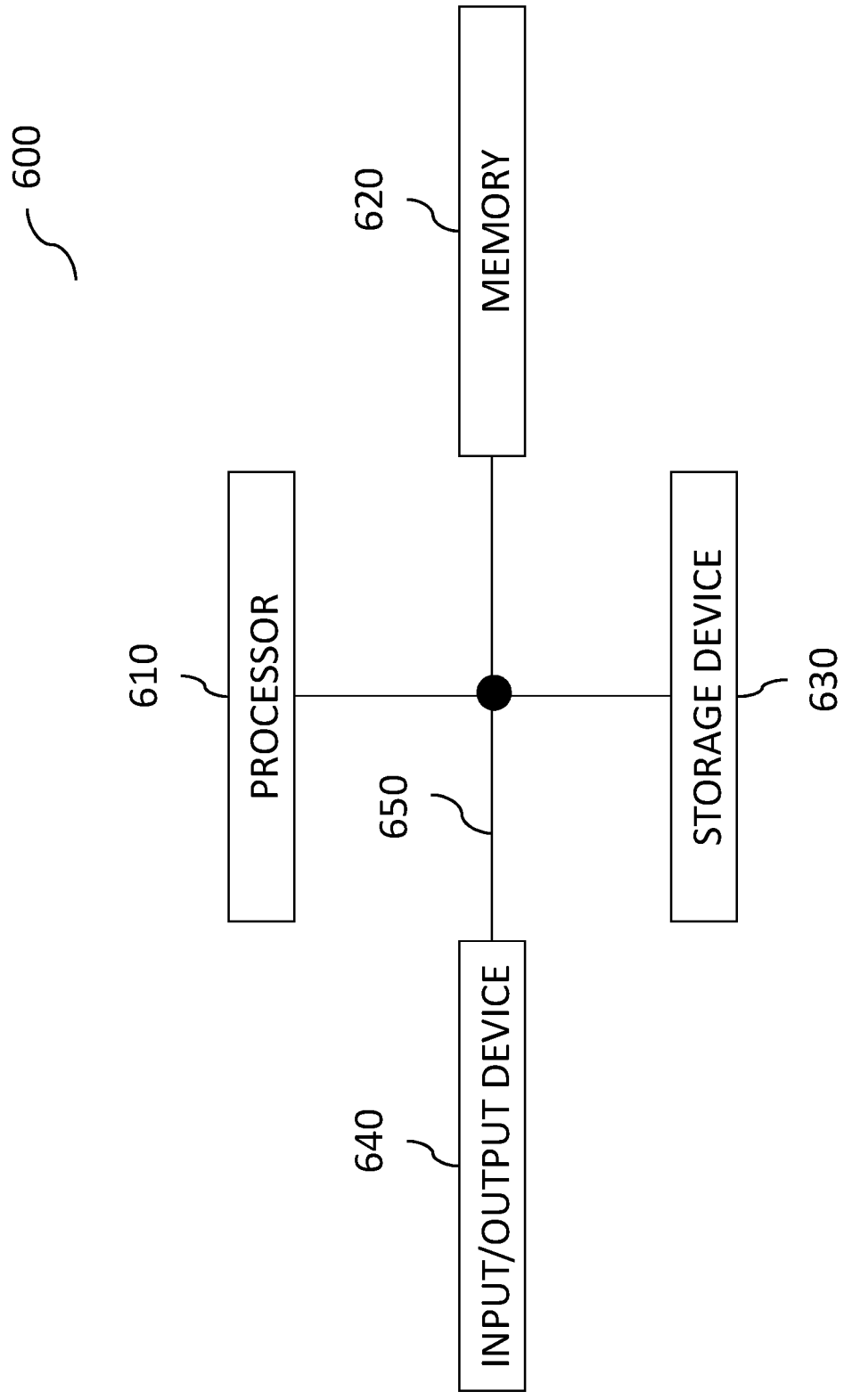
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
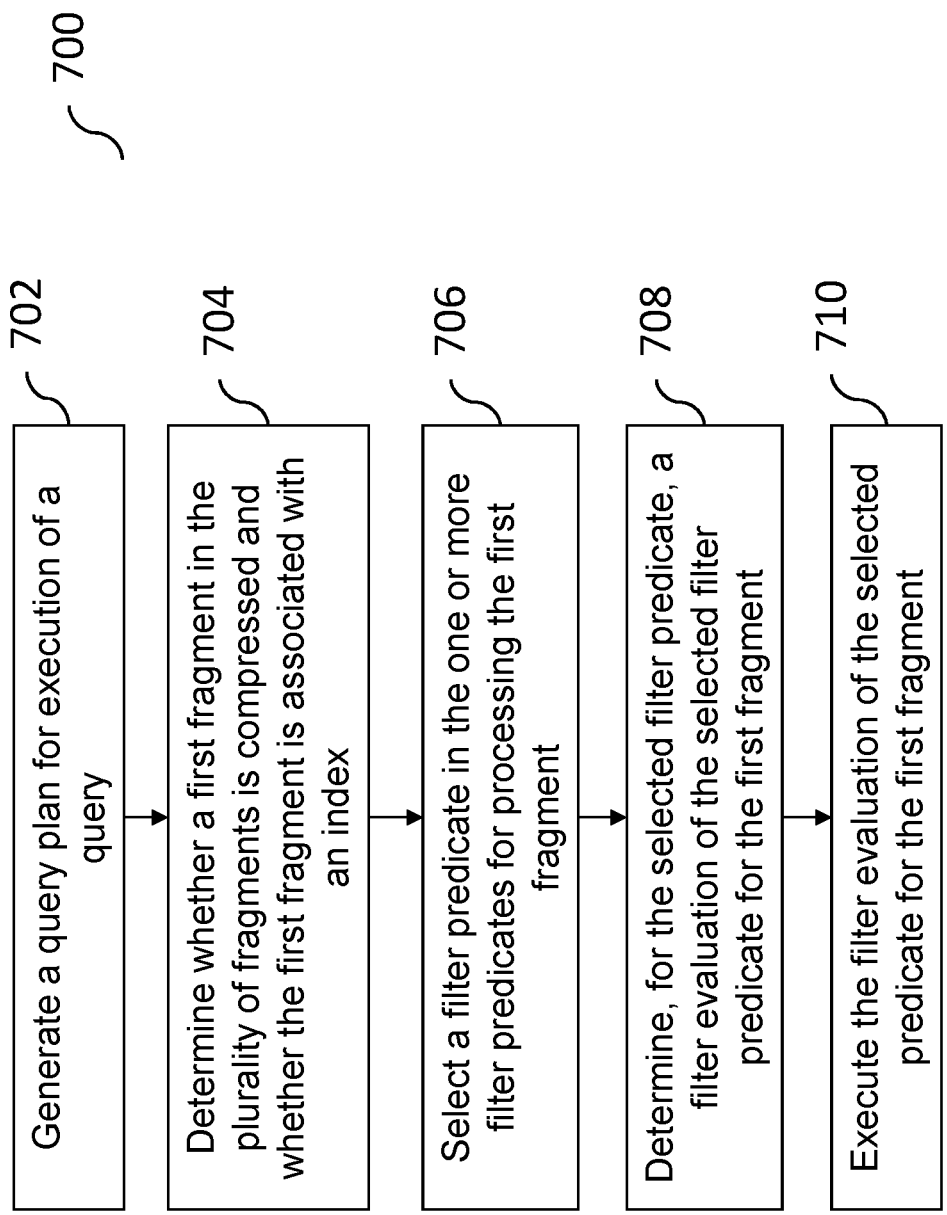
FIG. 7 is an exemplary method, according to some implementations of the current subject matter.

FIG. 7 illustrates an exemplary method 700 for executing a query in a database system, according to some implementations of the current subject matter. At 702, a query plan for execution of a query may be generated. The query may require access to at least one table stored in a database system. The query including one or more filter predicates. The table may be partitioned into a plurality of fragments. At 704, the system 300 (as shown in FIG. 3) may determine whether a fragment in the plurality of fragments is compressed and whether the fragment is associated with an index. At 706, a filter predicate (e.g., ITEM_KEY=1) in the plurality of filter predicates may be selected for processing the fragment. At 708, the system 300 may determine a filter evaluation strategy of the selected filter predicate for the fragment. At 710, the filter evaluation strategy of the selected predicate for the fragment may be executed.

In some implementations, the current subject matter can include one or more of the following optional features. The plurality of fragments may include at least one of the following: a main fragment associated with a column of the table and a delta fragment associated with the column of the table. The delta fragment may include one or more modification of a data included in the column.

In some implementations, the index may include at least one of the following: a full index and a block index. Further, upon determination that the fragment is not compressed, at least one index lookup operator may be used during execution of the filter evaluation of the selected predicate for the fragment. Upon determination that the fragment is compressed, at least one data vector scan operator may be used during execution of the filter evaluation of the selected predicate for the fragment.

In some implementations, filter evaluation strategies may include at least one of the following combinations: a dictionary scan and a data vector scan, a dictionary scan and a data vector lookup, a dictionary scan and an index lookup, and a data vector lookup and a dictionary lookup.

In some implementations, the query may be executed by a database execution engine and the query may be received from an application separate from the database execution engine. The query may be executed in accordance with the query plan optimized by the database execution engine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
generating a query plan for execution of a query, the query requiring access to at least one table stored in a database system, the query including one or more filter predicates, the at least one table being partitioned into a plurality of fragments;
determining whether a fragment in the plurality of fragments is compressed and whether the fragment is associated with an index and determining a compression type of the compressed fragment, wherein the plurality of fragments includes at least one of the following: a main fragment associated with a column of the at least one table and a delta fragment associated with the column of the at least one table, wherein the delta fragment includes one or more modification of a data included in the column;
selecting a filter predicate in the one or more filter predicates for processing the fragment;
determining, for the selected filter predicate, based on the compression type of the compressed fragment and a cost function, an available filter evaluation in the plurality of filter evaluations of the selected filter predicate for the fragment, the cost function being determined for each filter evaluation in the plurality of filter evaluations, wherein the available filter evaluation includes at least one of the following combinations: a dictionary scan and a data vector scan, a dictionary scan and a data vector lookup, a dictionary scan and an index lookup, and a data vector lookup and a dictionary lookup; and
executing the available filter evaluation of the selected predicate for the fragment.

2. The method according to claim 1, wherein the index includes at least one of the following: a full index and a block index.

3. The method according to claim 2, wherein, upon determination that the fragment is not compressed, using at least one index lookup operator during the executing of the filter evaluation of the selected predicate for the fragment.

4. The method according to claim 2, wherein, upon determination that the fragment is compressed, using at least one data vector scan operator during the executing of the filter evaluation of the selected predicate for the fragment.

5. The method according to claim 1, wherein the query is executed by a database execution engine and the query is received from an application separate from the database execution engine, wherein the query is executed in accordance with the query plan optimized by the database execution engine.

6. A system comprising:
at least one programmable processor; and
a non-transitory machine-readable medium storing instructions that, when executed by the at least one programmable processor, cause the at least one programmable processor to perform operations comprising:
generating a query plan for execution of a query, the query requiring access to at least one table stored in a database system, the query including one or more filter predicates, the at least one table being partitioned into a plurality of fragments;
determining whether a fragment in the plurality of fragments is compressed and whether the fragment is associated with an index and determining a compression type of the compressed fragment, wherein the plurality of fragments includes at least one of the following: a main fragment associated with a column of the at least one table and a delta fragment associated with the column of the at least one table, wherein the delta fragment includes one or more modification of a data included in the column;
selecting a filter predicate in the one or more filter predicates for processing the fragment;
determining, for the selected filter predicate, based on the compression type of the compressed fragment and a cost function, an available filter evaluation in the plurality of filter evaluations of the selected filter predicate for the fragment, the cost function being determined for each filter evaluation in the plurality of filter evaluations, wherein the available filter evaluation includes at least one of the following combinations: a dictionary scan and a data vector scan, a dictionary scan and a data vector lookup, a dictionary scan and an index lookup, and a data vector lookup and a dictionary lookup; and
executing the available filter evaluation of the selected predicate for the fragment.

7. The system according to claim 6, wherein the index includes at least one of the following: a full index and a block index.

8. The system according to claim 7, wherein, upon determination that the fragment is not compressed, using at least one index lookup operator during the executing of the filter evaluation of the selected predicate for the fragment.

9. The system according to claim 7, wherein, upon determination that the fragment is compressed, using at least one data vector scan operator during the executing of the filter evaluation of the selected predicate for the fragment.

10. The system according to claim 6, wherein the query is executed by a database execution engine and the query is received from an application separate from the database execution engine, wherein the query is executed in accordance with the query plan optimized by the database execution engine.

11. A computer program product comprising a non-transitory machine-readable medium storing instructions that, when executed by at least one programmable processor, cause the at least one programmable processor to perform operations comprising:

generating a query plan for execution of a query, the query requiring access to at least one table stored in a database system, the query including one or more filter predicates, the at least one table being partitioned into a plurality of fragments;

determining whether a fragment in the plurality of fragments is compressed and whether the fragment is associated with an index and determining a compression type of the compressed fragment, wherein the plurality of fragments includes at least one of the following: a main fragment associated with a column of the at least one table and a delta fragment associated with the column of the at least one table, wherein the delta fragment includes one or more modification of a data included in the column;

selecting a filter predicate in the one or more filter predicates for processing the fragment;

determining, for the selected filter predicate, based on the compression type of the compressed fragment and a cost function, an available filter evaluation in the plurality of filter evaluations of the selected filter predicate for the fragment, the cost function being determined for each filter evaluation in the plurality of filter evaluations, wherein the available filter evaluation includes at least one of the following combinations: a dictionary scan and a data vector scan, a dictionary scan and a data vector lookup, a dictionary scan and an index lookup, and a data vector lookup and a dictionary lookup; and executing the available filter evaluation of the selected predicate for the fragment.

12. The computer program product according to claim 11, wherein the index includes at least one of the following: a full index and a block index.

13. The computer program product according to claim 12, wherein, upon determination that the fragment is not compressed, using at least one index lookup operator during the executing of the filter evaluation of the selected predicate for the fragment.

14. The computer program product according to claim 12, wherein, upon determination that the fragment is compressed, using at least one data vector scan operator during the executing of the filter evaluation of the selected predicate for the fragment.

* * * * *